United States Patent Office 3,405,242
Patented Oct. 8, 1968

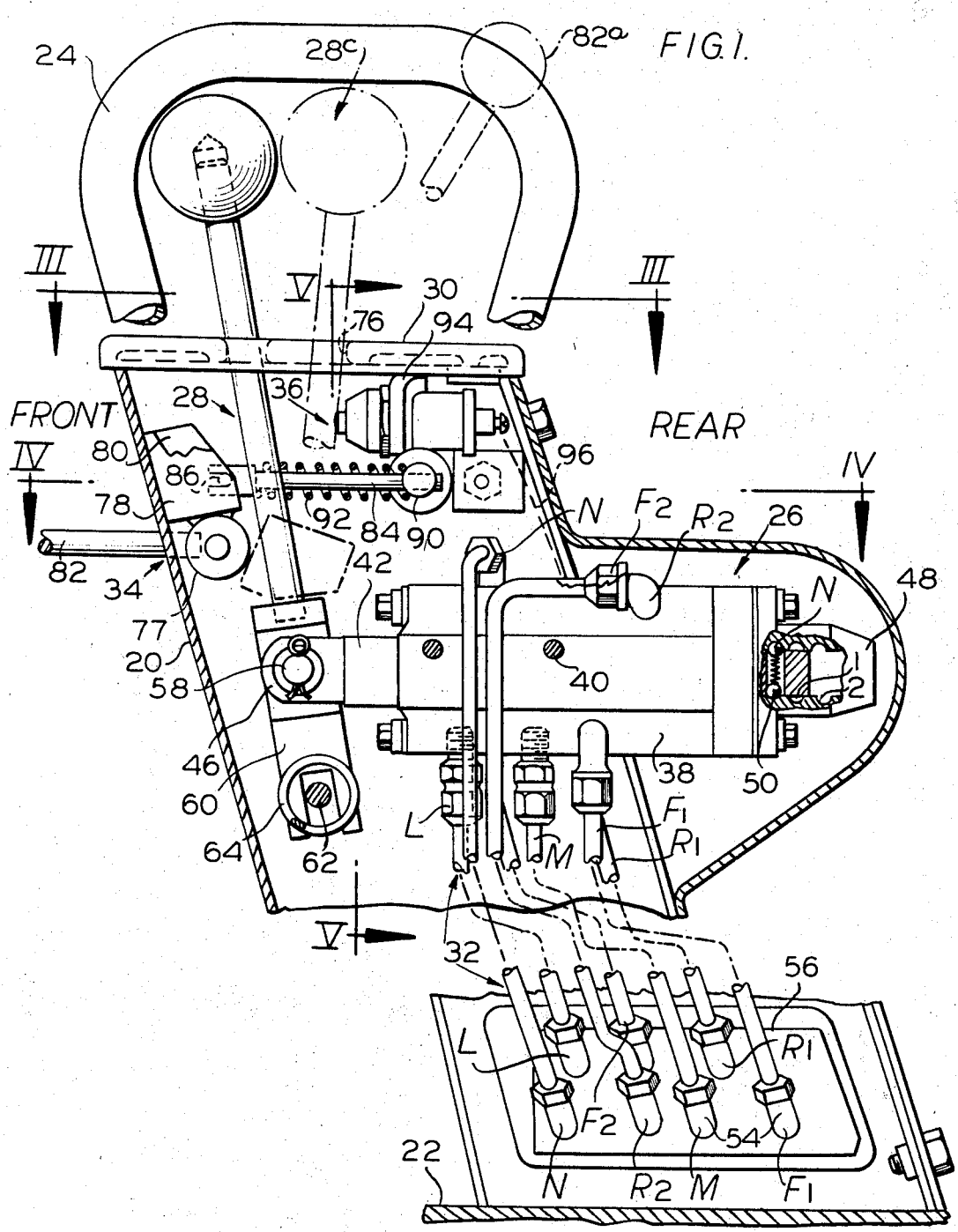

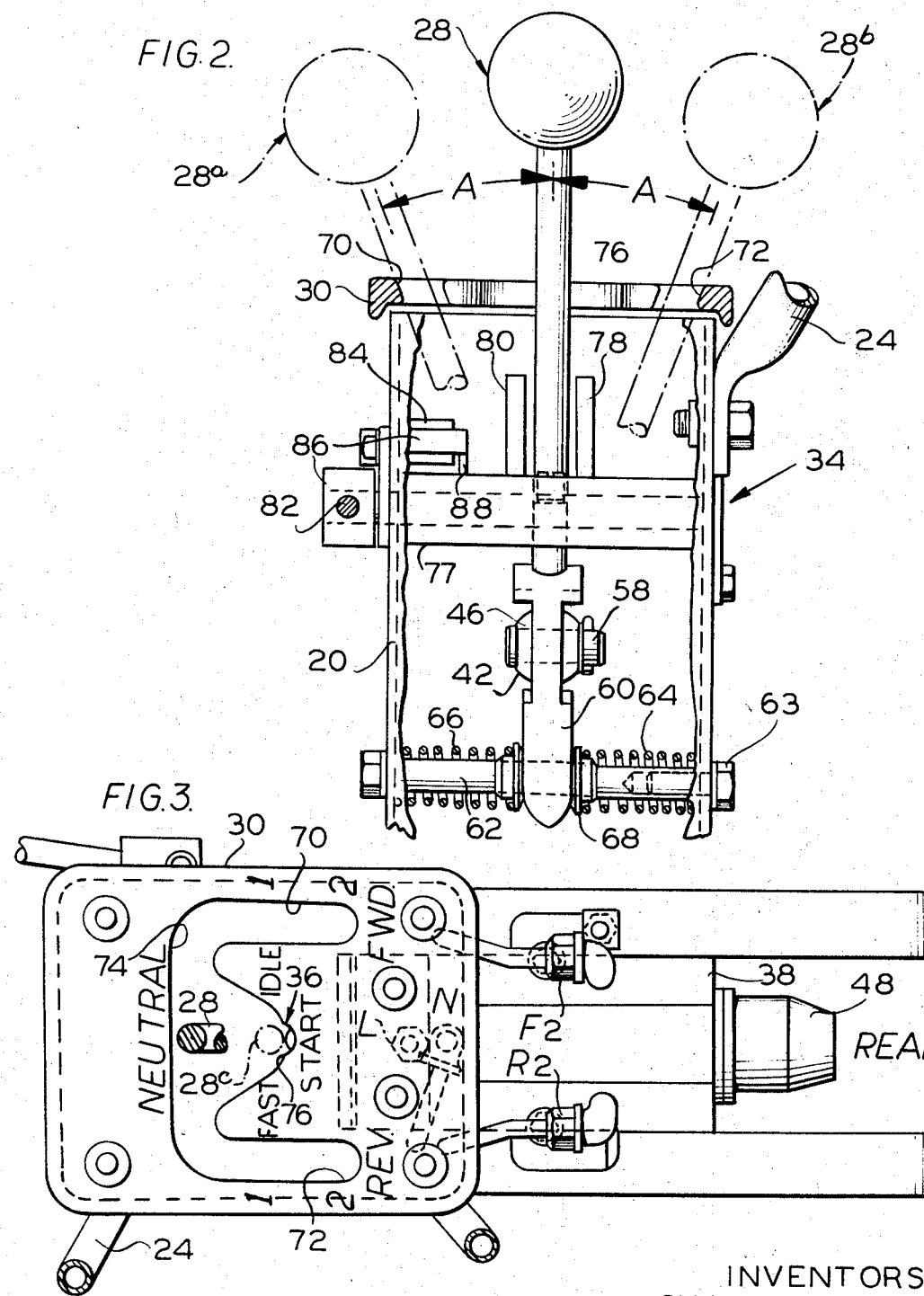

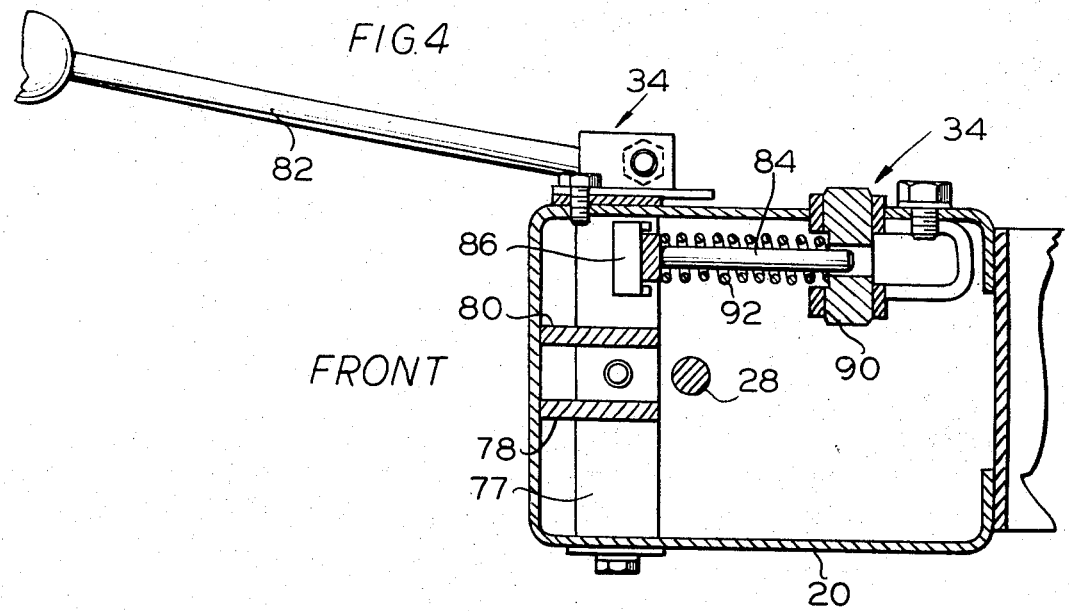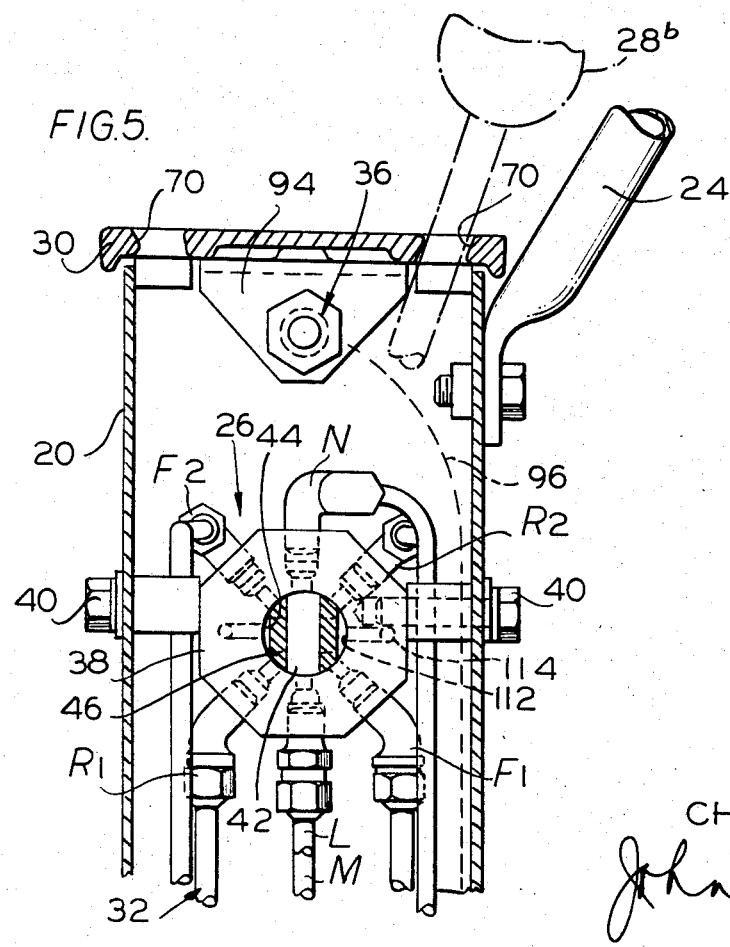

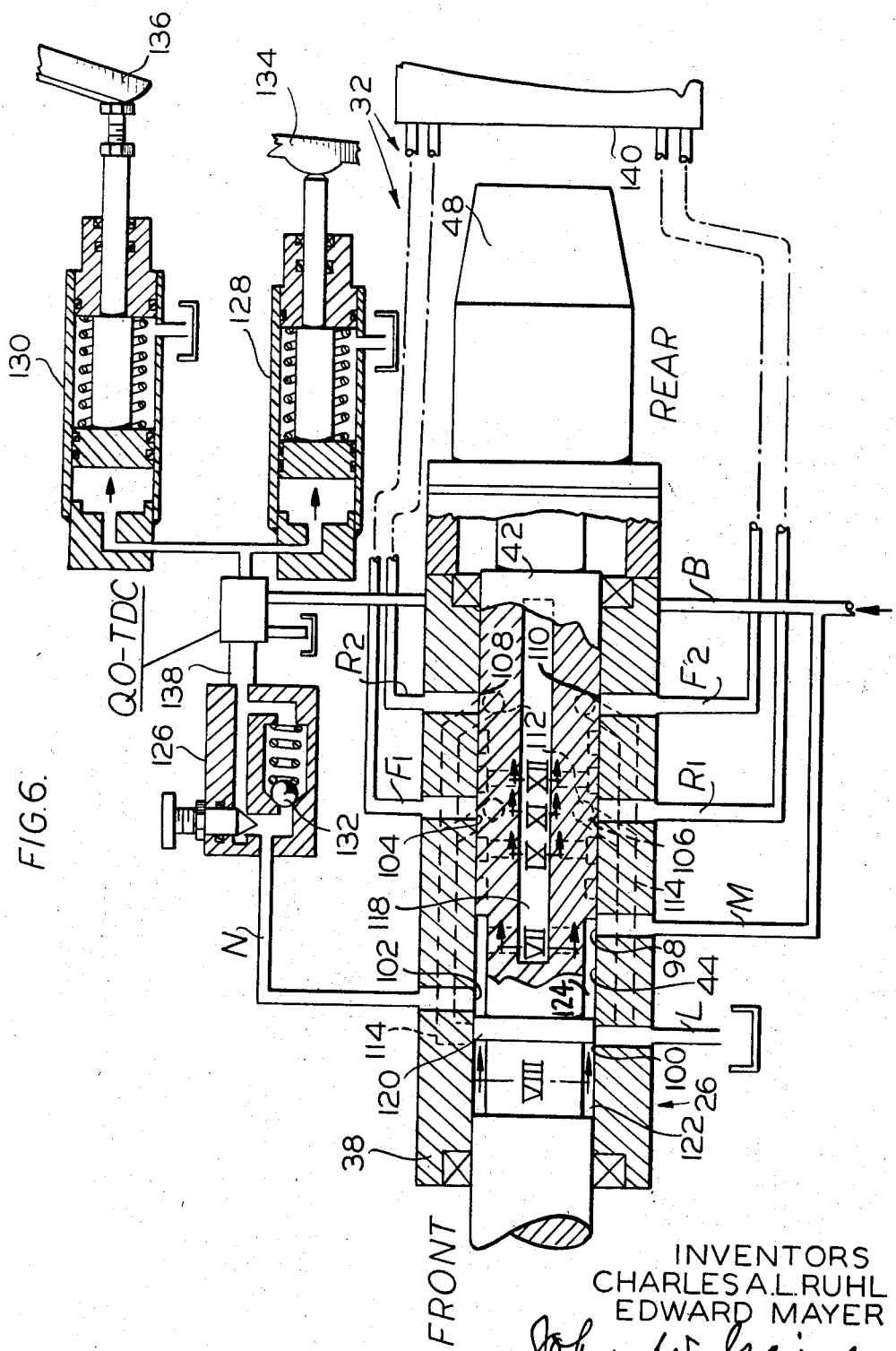

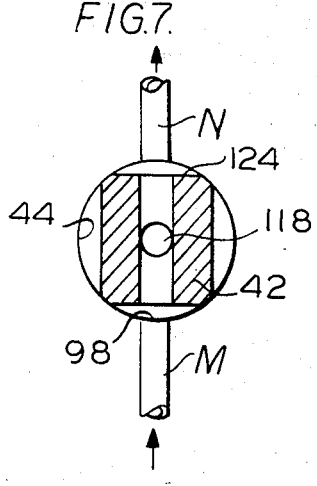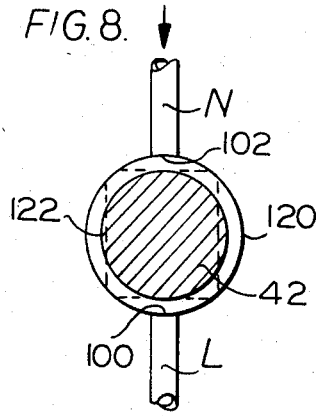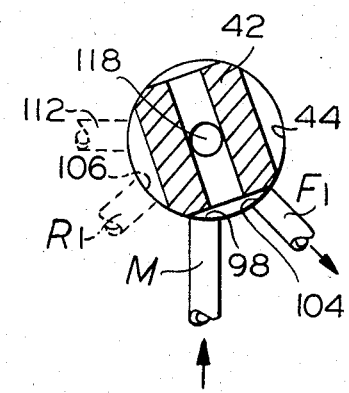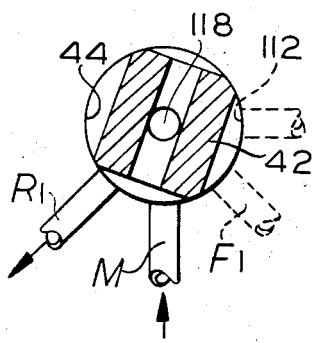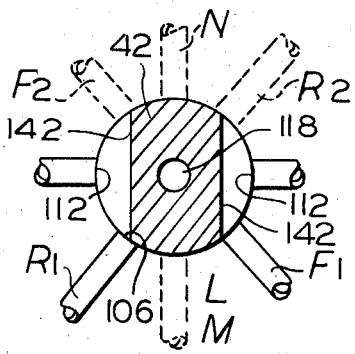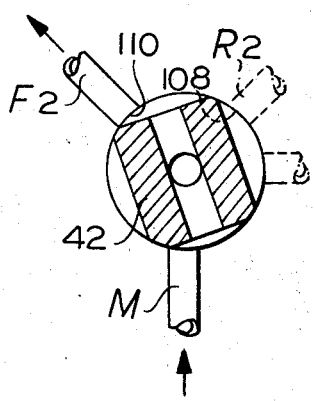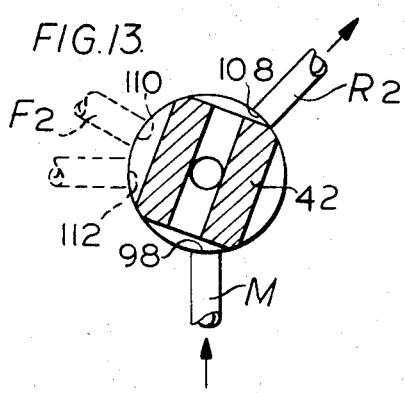

3,405,242
VALVE WITH SWITCH FOR CONTROLLING ENGINE, TRANSMISSION, AND BRAKE
Charles A. L. Ruhl, Wheaton, and Edward Mayer, North Riverside, Ill., assignors to International Harvester Company, Chicago, Ill., a corporation of Delaware
Filed Feb. 3, 1966, Ser. No. 524,692
4 Claims. (Cl. 200—61.86)

ABSTRACT OF THE DISCLOSURE

Multiway forward-reverse range valve selectively shiftable by a valve lever among neutral, reciprocated, and combined rotated and reciprocated positions to co-ordinate the functions of a vehicle engine, cranking motor, power train clutch, and ground engaging brakable means. The valve lever in shifting the valve is effective to cause the engine to be cranked, to fast idle, or to idle in neutral at an ordinary speed, and the lever operates in conjunction with a safety handle that is provided so that the lever can be locked in neutral preventing it and the power train entering the drive range.

---

The present application is a continuing case of Ruhl copending U.S. patent application Serial No. 507,010 filed November 9, 1965, the disclosure of which, in entirety, is incorporated herein by reference.

This application pertains to a remote pilot valve and to forward-reverse drive controls operated thereby, for use in conjunction with a vehicle transmission which is so controlled that, when being operated into a reverse setting by the valve and controls, the transmission without delay neutralizes and, with a delay effect, then takes the opposite or reverse drive setting. The application pertains especially to such a valve and controls operated thereby, providing for both automatic engagement of the vehicle brakes and automatic idling of the engine upon disengagement or neutralizing of the transmission, as well as providing for automatic release of the brakes and restoration of the engine to a speed above regular idling when the transmission re-engages.

In that manner the coordination in the vehicle, of the several controls which are involved, insures that the takeover shock in the reverse power path through the transmission never builds up to a dangerous, or worse, a damaging force, and the overall system as so coordinated is covered in the referred to U.S. patent application Serial No. 507,010.

The present invention relates to a consolidated pilot valve structure particularly adapted to operate the several controls and doing so without complication. In order to avoid a multiplicity of seperate remote valves for operating or piloting the various controls, and also to avoid a complicated piping and valve passage system for the separate valves, it is our general objective to operate such controls with a single pilot valve in which the various functions are consolidated so as to simplify the task of the vehicle operator and to render the operation as foolproof as practicable.

An object in line with the preceding objective is the provision of a plate-guided, valve-connected lever, and a guiding plate therefor having spaced apart longitudinal slots and a common, intersecting gate, which is disposed perpendicularly to and crosses into and past the central reference plane at each side thereof. In addition to providing for a plurality of positions of progressively deep adjustment of the lever and valve in the central reference plane, the gate is relieved in that plane so as to accommodate overtravel of the valve lever into a start position for closing the engine self-starter circuit which is provided in the vehicle.

Another object of the invention is the provision of a multiway valve such as the foregoing, consolidated into a single remote pilot valve, in which a remote valve casing slidably receives the valve in a cylindrical chamber therein provided. In this arrangement, the chamber in the casing is provided with a fluid inlet and outlet, a ported service line leading therefrom to vehicle drive control cylinder means, and a plurality of pairs of ports arranged circumferentially of the cylindrical chamber with one port of each pair located on one side and the other port of each pair on the opposite side of the cylindrical chamber. Further, this arrangement is one in which longitudinal passage and ported means are provided in the valve for selectively connecting a port on one side thereof to the respective inlet or outlet, and port on the opposite side to the respective outlet or inlet when the valve advances in the casing from an unmoved neutral position into a combined rotated and reciprocated position, and in which the valve has a generally annular spool and slot means for connecting the service line port selectively to either the inlet or outlet.

An object in line with the preceding objective is the provision of deceleration and braking cylinder means, connected by the service line to the service line port in the valve casing and utilized when activated to decelerate the vehicle engine and to apply the vehicle brakes, and the provision further of a check choke valve connected in the service line and unseating and seating in directions whereby the effect of the remote valve inlet pressure to activate the decelerating and brake applying cylinder means takes place without delay, and the flow resulting from connecting the cylinder means to communicate with the outlet pressure takes full effect after a set delay.

Further features, objects, and advantages will either be specifically pointed out or become apparent when, for a better understanding of the invention, reference is made to the following description, taken in conjunction with the accompanying drawings which show a preferred embodiment thereof and in which:

FIGURES 1, 2 and 3, in which certain parts are broken away for clarity, are respective left side, front, and top plan views of a vehicle control tower embodying the present valve invention, including the mechanism associated with the valve;

FIGURES 4 and 5 are views taken in top plan and front elevation along the respective section lines IV—IV and V—V appearing in FIGURE 1;

FIGURE 6 is a schematic, longitudinal sectional view of the valve generally corresponding to the showing of FIGURE 1 and clarifying some of the hydraulic connections; and The respective cross-sectional views of FIGURES 7, 8 and 9 correspond to the section lines VII—VII, VIII—VIII, and IX—IX; the view of FIGURE 10 corresponds to the section lines IX—IX, and with the fluid line M superimposed thereon to clarify the active circuit; the views of FIGURES 11 and 12 correspond to the section lines XI—XI and XII—XII, and with the fluid line M superimposed theron to clarify the circuits; and the view of FIGURE 13 corresponds to the section lines XII—XII and has the fluid line M superimposed thereon to clarify the active circuit, all such section lines appearing in FIGURE 6.

More particularly in FIGURE 1 of the drawings, a tractor control tower assembly is shown having a tower 20 provided with a metal housing and disposed at an acute vertical angle so as to tilt forwardly in a longitudinal vertical plane of an engine powered, transmission driven vehicle 22. The tower 20 is secured at the base to the vehicle 22 and the metal housing is generally rectangular in cross-section. In one physically constructed embodiment of the invention, the tower 20 was secured to the floor of the vehicle at a convenient location in substantial transverse alignment with the left-hand side of the operator's seat. A horizontal hand rail 24 is secured to the top of the tower 20 on the outer side of the metal housing.

The components carried by the tower 20, mostly carried therewithin, include as a main group a single remote pilot valve 26, a valve hand lever 28, a gate plate 30 for guiding the lever and valve, and an hydraulic circuit 32 generally appearing as conduits, whereby the valve 26 gives to the vehicle operator complete control over a delay valve type, power shifted transmission, and also control over a power operated decelerator for the vehicle engine, not shown, and power brakes, not shown, in the vehicle.

Besides these essentially hydraulic-control components, a releasable valve lock 34 provided in the tower constitutes a mechanical component therein, and a starter switch 36 constitutes an electromechanical component.

A crawler tractor is primarily contemplated as the present vehicle, and standard controls are used elsewhere thereon such as steering controls, engine manual speed controls, braking controls, and accessory controls. For purposes of simplification, no tractor is illustrated and neither are the standard controls.

*Remote pilot valves—FIGURES 1 and 5*

A fore and aft extending valve housing 38 of generally hexagonal shape in cross section is fixed by a set of bolts 40 in the metal control tower 20. A spool element or valve 42 is slidably received in a cylindrical chamber 44 in the housing 38 for selective reciprocation or rotation therein. The valve 42 has a fork 46 which projects from the front of the housing 38.

At the rear 48 of the housing 38, the valve 42 carries in a transverse bore a pair of ball detents 50 which are biased outwardly by a common spring and which hold the valve 42 in longitudinal positions by releasably seating in individual, coaxial ball detent grooves N, 1, and 2 in the rear portion 48. The valve therefore has extended, partially deep, and full deep positions in the housing 38.

The hydraulic circuit 32 includes the conduits referred to, a set of fittings 54 on one side of an hydraulic junction plate 56 in the base of the tower 20, and a set of interconnecting fittings and conduits, not shown, on the opposite side of the plate 56 by means of which the tower assembly is hydraulically connected to the referred to decelerator, power brakes, and delay valve type, power shift transmission.

*Valve lever—FIGURES 1 and 2*

The valve 42 pivotally carries the lever 28 by means of a connecting pin 58 passing through the valve fork 46 and through an intermediate portion of the lever. As the valve 42 rotates, the lever 28 rotatably tilts therewith about the valve axis and occupies the positions shown by the lines 28, 28a, and 28b and disposed in the respective ones of three radial planes which intersect the axis of the valve 42. When disposed in each of the planes, the lever 28 pivots therein on its slotted lower end 60 about a horizontal rod 62 engaged in the slot and bolted at 63 crosswise to the metal tower 20. The rod 60 is thus fixed in a plane perpendicular to the axis of the valve 42.

The longitudinal vertical plane through the valve axis forms a central reference plane among the three planes, and two opposing compression springs 64 and 66, carrying seats 68 at their inner end, engage the slotted lower end 60 of the valve lever 28. The springs expand and reach a balanced position when they have moved the lever into the solid line position 28 shown in FIGURE 2 occupying the central reference plane. The dihedral angles A indicated on either side of the central reference plane were each 20 degrees in one physically constructed embodiment of the invention.

*Gate plate—FIGURE 3*

The valve lever 28 has a knob carrying, upstanding end projecting through the horizontally disposed gate plate 30 at the head of the tower 20. The plate 30 guides movement of the lever 28 and includes longitudinal inner and outer slots 70 and 72, respectively, and a transverse slot portion or gate 74 interconnecting the inner and outer slots. The valve lever takes the position shown by the solid lines 28 in FIGURES 1 and 3 when the remote valve 42 is in a neutral (N) setting and, upon predetermined rearward movement of the knob, takes a fast idle (FI) position shown by the broken lines 28c in FIGURES 1 and 3 and corresponding to the valve 42 being in a fast idle setting. By overtravel, the lever 28 is capable of limited movement further rearwardly, from FI into a start position (S) in which it occupies a perpendicularly relieved portion 76 of the gate.

In transferring among the positions just described, the lever 28 is simply pivoting about its lower end 60 in the central reference plane. The longitudinal inner and outer slots 70 and 72 coincide with the other two planes in which the lever 126 pivots.

More specifically, the valve lever 28 has two positions in the inner slot 70, moving the valve 42 into a low range forward setting F1 when the lever 28 transversely aligns with a plate marking 1 beside the slot and moving the valve into a high range forward setting F2 when the lever 28 aligns with a marking 2. Similarly, the lever 28 has positions in the outer slot 72 so as to transversely align with the markings 1 or 2, respectively, thus moving the remote valve 42 into a corresponding low range reverse setting R1 or a high range reverse setting R2.

*Valve lock—FIGURES 1, 2 and 4*

The valve 42 and the valve lever 28 are prevented from rotating out of the central reference plane by the releasable lock 34. The lock mechanism includes a tubular shaft 77 journalled to rotate on a fixed axis in the upper end of the tower 20. The shaft 77 carries a rigid pair of parallel, closely spaced apart plates 78 and 80 which can be turned thereby from an unpivoted position, shown in solid lines, into a pivoted position shown in broken lines in FIGURE 1 in which the plates straddle the lever 28. The valve 42 is rendered incapable of causing transmission engagement in the vehicle, but the valve is free from interference in its movement among the N, FI, and S positions.

The shaft 77 carries at the inner end a selector lock safety handle 82 which, in the unpivoted position, extends horizontally forward from the tower 20. When pivoted into the locking position shown by the broken lines 82a in FIGURE 1, the safety handle 82 intervenes between the operator and the valve lever 28, as a reminder that the transmission is locked out of the drive settings.

A toggle formed by a forked slide rod 84 and a crank pin 86 holds the valve lock 34 in its respective unpivoted and pivoted positions. The pin 86 is carried in a upstanding bracket 88 rigid with the shaft 77. The slide rod 84 is carried by a pivot block 90 which is capable of limited rotation on a fixed axis in the tower 20. A compression spring 92 at one end seats on the pivot block 90 and at the other end biases the slide rod 84 outwardly therefrom into engagement with the pin 86.

Movement of the lock 34 from the solid line position into the locked pivoted position causes the pin 86 to cross and move slightly past a right line connecting the respective axes of the shaft 77 and the pivot block 90. The compression spring 92 is further compressed in the process, and holds the lock unless and until the operator resets the lever from the broken line locked position 82a into the off or unpivoted position.

Start switch—FIGURES 1, 3 and 5

A bracket 94 depending from the underside of the horizontal gate plate 30 carries the start switch so that the button thereof is disposed in the path of rearward overtravel of the valve lever 28. The electrical conductors between the starter switch 36 and a starter motor relay, not shown, are schematically indicated at 96. In order to crank-start the engine of the vehicle, the operator forces the lever 28 to overtravel temporarily into the S position, but releases it so as to cease to crank as soon as he has the engine running.

Hydraulic circuit—FIGURE 6

The cylindrical chamber 44 in the valve housing 38 is intersected by an inlet 98 and an outlet 100 disposed therein in longitudinally spaced apart relation at the bottom, and also intersected by a service line inlet-outlet port 102 disposed at the top intermediate the inlet and outlet. A pair of low range ports 104 and 106 is formed in the chamber 44 at the opposite sides thereof and a pair of high range ports 108 and 110 is formed at another longitudinal location and on opposite sides of the chamber 44. A set of four drain ports 112 formed at points in the sides of the chamber 44 is connected by means of a pair of headers 114 to a return line, which is a conduit common thereto and to the outlet 100. The abbreviated functional designation L is applied to the common return line, and the further abbreviated functional designations M, N, F1, F2, R1, and R2, are applied to individual conduits in the hydraulic circuit 32.

The valve 42 includes various ported radial passages intersecting a common longitudinal passage 118, and is grooved or relieved at various out side points hereinafter described by milled slots on the right, left, top, and bottom sides thereof.

An annular division land or spool 120 on the valve 42 has two other spools which are disposed one on each side thereof and which are in space apart relation so as to define therewith annular lube or low pressure groove or slot 122 communicating with the return line L, and main line pressure slots 124 communicating through the inlet 98 with a main pressure line M.

The service line inlet-outlet port 102 is connected to a service or neutral line N which includes a flow check or check choke valve 126 so as to control the application and exhaustion of pressure to and from a decelerator cylinder 28 and an automatic braking cylinder 130. The valve 126 includes a ball check 132 unseating in a direction whereby the effect of control pressure application to operatively extend the deceleration and brake applying cylinders 128 and 130 takes place without delay, and a delay effect takes place as the valve 126 releases pressure so as to retract the cylinders.

The deceleration and braking operation is more completely described in the referred to U.S. patent application Ser. No. 507,010. Briefly, the cylinders 128 and 130 extend simultaneously and retract simultaneously. The cylinder 128 pushes against and displaces, and later releases a decelerator link 134 which, while it is displaced, forces the vehicle engine to idle irrespective of the manual speed setting. Extension and retraction of the braking cylinder 130 exerts a push against and displaces, and then releases a power brake valve lever 136 which, in the displaced position, causes the so-called pivot brakes, not shown, to engage and stop the vehicle.

The operation of the power cylinders by the choke valve 126 has been oversimplified for clarity. In actual practice, a piloted valve QO-TDC of the quick opening, time delay closing type will intervene as a relay-type connection between the valve 126 and cylinders, and be piloted by the pilot valve 42 so as to function as a delay valve. For that operation, pressure is rapidly applied by the valve 126 to a pilot cylinder 138 on the valve QO-TDC, but is slowly exhausted from that cylinder 138 during the opposite phase of the cycle. A branch line B provided between the main pressure line M and the valve QO-TDC, and return line from the latter valve allow pressure to be directly applied and directly exhausted by the valve QO-TDC to and from the cylinders 128 and 130.

The operation of a transmission structure 140 in the vehicle, now to be briefly described, has also been oversimplified. In practice, the valve QO-TDC is connected to a set of valves, not shown, called the range selector valving of the transmission structure. The latter valving operates without delay when the transmission structure is neutralized thereby, but has a set delay before the valving can establish a drive or reverse the drive of the vehicle, due to the overriding effect of the delay valve QO-TDC.

The remaining set of conduits F1, F2, R1 and R2 in the hydraulic circuit 32, leading between the remote valve casing 38 and the vehicle transmission structure 140, individually connects the group of range ports 104, 106, 108 and 110, and the so-called range selector valving in the transmission structure 140. Briefly, the latter valving controls a forward clutch pack, not shown, providing low range F1 and high range F2 forward drives, and a reverse clutch pack, not shown, providing low range reverse R1 and high range reverse R2 drives in power paths through gearing in the transmission structure 140.

3-position 7-way valve—FIGURES 6–13

In the combinations among its thre longitudinal positions and three planes into which it can be rotated, the valve 42 assumes the already defined settings N, FI, F1, F2, R1, and R2. The result is seven ways of interconnecting the conduits of the hydraulic circuit 32, namely, the lines N, L, M, F1, F2, R1, and R2.

In the N position illustrated in FIGURES 6 and 7 in which the valve 42 is unmoved from the fully extended position in its central reference plane, line pressure from the main pressure line M is directed by the valve 42 only to the inlet-outlet service port 102, and also from the main line branch B by the quick opening valve QO-TDC to the decelerator and brake cylinders 128 and 130. More particularly, the main line pressure slots 124 on the intervening valve 42 interconnect the inlet 98 and the inlet-outlet port 102 of the service line N, whereas the valve spool 120 blocks the outlet 100 from the inlet-outlet port 102 just referred to. The effect is that the vehicle brakes are set and the engine speed control is positioned in the engine idling position. This effect occurs without delay when the valve moves from any other position into the N position.

In the FI position shown in FIGURE 8 in which the valve 42 has a partial depth of reciprocation, the annular groove 122 interconnects the inlet-outlet port 102 and the outlet 100, whereas the valve spool 120 in the background blocks the inlet-outlet port 102 from the inlet 98. Consequently, the delay valve QO-TDC is piloted slowly open, automatically depressurizing and simultaneously retracting the cylinders 128 and 130. A delay of 2½ seconds has been found suitable and, after the set delay, the engine is restored to a speed corresponding to the manual setting and the vehicle brakes are released.

In both the N and the FI positions, the group of range ports 104, 106, 108 and 110 is connected through the set of drain ports 112 to the return line L. Both sides of each clutch pack are depressurized and therefore inactivated, and no drive is transmitted in the vehicle. FIGURE 11 shows this condition, wherein milled slots 142 on opposite sides of the valve 42 interconnect the low range ports 104 or 106 at each side with the drain port 112 at that side. A similar interconnection handles drainage of the high range ports 108 and 110.

In the F1 position as viewed in FIGURE 9, in which the valve 42 is rotated to the left as so viewed, and has a partially deep position of reciprocation, main line fluid is directed in a path including the inlet 98, the longitudinal passage 118, and the low range port 104 so that the conduit F1 is pressurized and the appropriate clutch causes the vehicle to proceed in low speed forward. Simultaneously, the opposed low range port 106 communicates, through a milled slot in the side of the valve 42, with the adjacent drain port 112 and the return line L so that the low range reverse drive clutch is inactive.

In the R1 position as viewed in FIGURE 10, in which the valve 42 is rotated full rightwardly as so viewed, and has the partially deep position of reciprocation the same as in FIGURE 9, the low range reverse conduit R1 is pressurized at main line pressure for reverse drive, and the conduit F1 is connected by a milled slot in the valve 42 to the adjacent drain port 112. In both FIGURE 9 and FIGURE 10, the high range ports 108 and 110, not shown, are at this time each connected by adjacent drain ports 112 to the return line L.

In the F2 and R2 positions illustrated in FIGURES 12 and 13, respectively, in which the valve 42 is rotated to one side or to the other of the central plane and has the full depth position of reciprocation within the valve housing, the selected one of the high range ports 108 or 110 is connected to main line pressure and the other one is connected to the return line L. In both cases, the conduits F1 and R1 are connected to the return line L and the resulting drive is high speed forward or high speed reverse as selected.

Positioning of the valve 42 to any setting from the N position, or from a set position through the N position and into another position, allows both the brake release and the engine advancement from enforced idle setting to the manual speed setting to be accomplished, but only after the automatic delay effect created by the valve QO-TDC. Therefore if a drive is established or the drive is changed through the vehicle transmission structure 140, the transmission is conditioned automatically beforehand due to an enforced minimum speed of rotation on its input side and due to little if any coasting speed residual on its output side. The reason is independent of the pilot valve rotation and is already assigned in the description of the FI position. That is to say, the annular groove 122 and the spool 120 of the valve 42 coact with the inlet-outlet port 102 to respectively connect it to the return line and block it from mainline pressure, whenever the pilot valve 42 is depressed to either a full depth or a partial depth position in its reciprocation.

What is claimed is:

1. An operator-operated transmission control device comprising:
   a remote valve housing;
   a remote valve slidably mounted in the housing for selective reciprocation or rotation therein;
   a reciprocation and rotation causing valve lever connected to the valve and rotatable from a central reference plane into two other planes, all such planes passing through the axis of the valve;
   said valve lever being pivotable to plural positions in each of said planes, including a valve neutral position and a fast idle position both in the central reference plane; and
   locking means engaging said valve lever for locking the valve in its central reference plane, and manual means connected to said locking means for selectively moving it to locking and unlocking positions.

2. An operator-operated transmission control device comprising:
   a remote valve housing;
   a remote valve slidably mounted in the housing for selective reciprocation or rotation therein;
   a reciprocation and rotation causing valve lever connected to the valve and rotatable from a central reference plane into two other planes, all such planes passing through the axis of the valve;
   said valve lever being pivotable to plural positions in each of said planes, including a valve neutral position and a fast idle position both in the central reference plane;
   lever engaging means for locking the valve in its central reference plane; and
   a selector lock safety handle (82) connected to the locking means and pivotable to a valve locking position in which the handle intervenes between the operator and said valve lever, said handle having an unpivoted position out of the way for unlocking the valve.

3. An operator-operated transmission control device comprising:
   a remote valve housing;
   a remote valve slidably mounted in the housing for selective reciprocation or rotation therein;
   a reciprocation and rotation causing valve lever connected to the valve and rotatable from a central reference plane into two other planes, all such planes passing through the axis of the valve;
   said valve lever being pivotable to plural positions in each of said planes, including a valve neutral position and a fast idle position both in the central reference plane;
   lever engaging means for locking the valve in its central reference plane;
   a gate plate slotted to receive said valve lever, and defining therefor spaced apart drive slots each formed in a different one of said two other planes, and a gate in the plate passing crosswise through the central reference plane and interconnecting the spaced apart slots, said gate having portions accommodating the aforesaid neutral and fast idle positions of the valve lever in its central reference plane, and being relieved so as to accommodate overtravel of the valve lever in the central reference plane into a start position; and
   a starter switch (36) fixed in the path of movement of the valve lever so that, upon overtravel of the valve lever into the start position, the lever closes the starter switch.

4. The invention of claim 3, further comprising:
   a selector lock safety handle connected to the locking means and pivotable to a valve locking position in which the handle intervenes between the operator and said valve lever, said handle having an unpivoted position out of the way for unlocking the valve, and characterized by the locking means when locked and the safety handle when accordingly pivoted to the corresponding intervening position aforesaid, accommodating movement of said lever to close the starter switch.

References Cited

UNITED STATES PATENTS

| | | | |
|---|---|---|---|
| 2,109,070 | 2/1938 | MacKenzie | 137—625.17 |
| 3,269,412 | 8/1966 | Badke | 137—625.17 |
| 3,308,849 | 3/1967 | Bohart | 137—625.17 |

BENJAMIN W. WYCHE III, *Primary Examiner.*